(12) United States Patent
Leberknight

(10) Patent No.: US 7,406,448 B2
(45) Date of Patent: Jul. 29, 2008

(54) DYNAMIC LOCATION BASED COST MINIMIZATION

(76) Inventor: Christopher S. Leberknight, 372 Mountain Lake Rd., Great Meadows, NJ (US) 07838

( * ) Notice: Subject to any disclaimer, the term of this patent is extended or adjusted under 35 U.S.C. 154(b) by 325 days.

(21) Appl. No.: 11/318,169

(22) Filed: Dec. 23, 2005

(65) Prior Publication Data

US 2006/0095390 A1   May 4, 2006

(51) Int. Cl.
   *G06Q 99/00* (2006.01)
(52) U.S. Cl. ............... 705/400; 705/1; 705/28; 700/300; 455/3.02
(58) Field of Classification Search ............ 705/1, 705/28, 400; 700/100, 300; 455/3.02
   See application file for complete search history.

(56) References Cited

U.S. PATENT DOCUMENTS

| | | | | |
|---|---|---|---|---|
| 6,594,557 | B1 * | 7/2003 | Stefan et al. ............ | 701/1 |
| 7,224,935 | B2 * | 5/2007 | Messina et al. ........... | 455/3.02 |
| 2002/0052674 | A1 * | 5/2002 | Chang et al. ............. | 700/300 |
| 2004/0198389 | A1 * | 10/2004 | Alcock et al. ........... | 455/456.1 |
| 2006/0265294 | A1 * | 11/2006 | de Sylva .................. | 705/28 |
| 2006/0291482 | A1 * | 12/2006 | Evans ..................... | 370/401 |

OTHER PUBLICATIONS

"GPS to locate cheap gasoline", Sep. 5, 2004., Sunday Gazette-Mail. Charleston, W.V., p. 6.D.( 1 pg).*
"TECH Briefs" [Metro Edition}, Aug. 1, 2004, San Antonio Express-News. San Antonio, Tex.: p. 2L (2pgs).*
"Microsoft Streets & Trips 2005", Aug. 24, 2004, CNET Reviews (3pgs) reviews.cnet.com/4505-3361_7-30974562.html.*

* cited by examiner

Primary Examiner—John W Hayes
Assistant Examiner—Freda A. Nelson
(74) Attorney, Agent, or Firm—Walter J. Tencza, Jr.

(57) ABSTRACT

A computer is programmed to receive data concerning a current location of a vehicle, a plurality of gas prices at a plurality of gas stations, and a plurality of locations, one location for each of the plurality of gas stations. The computer is programmed to determine a first gas station of the plurality of gas stations based on the current location of the vehicle, the plurality of gas prices, and the plurality of locations such that driving the vehicle from the current location to the first gas station and then to a final destination requires a first cost of gas, which is less than or equal to the cost of gas of driving the vehicle from the current location to any other gas station and then to the final destination. The data concerning the current location of the vehicle may be received from a global positioning system.

28 Claims, 3 Drawing Sheets

US 7,406,448 B2

DYNAMIC LOCATION BASED COST MINIMIZATION

FIELD OF THE INVENTION

This invention relates to improved methods and apparatus concerning the most cost effective location to buy products or services.

BACKGROUND OF THE INVENTION

When an individual wants to purchase gasoline or gas for their car, they want to get the best price for the gas. However, often the cheapest gas stations are located at a great distance from where the individual's vehicle is located. Currently there are insufficient techniques for determining the most cost effective gas station to buy gas from.

SUMMARY OF THE INVENTION

One embodiment of the present invention provides an apparatus comprising a computer, rocessor, or database. The computer is programmed to receive data concerning the current location of a vehicle. The computer is programmed to receive data concerning a plurality of gas prices at a plurality of gas stations, one gas price for each of the plurality of gas stations. The computer is programmed to receive data concerning a plurality of locations, one location for each of the plurality of gas stations. The plurality of locations are different. The computer is programmed to determine a first gas station of the plurality of gas stations based on the current location of the vehicle, the plurality of gas prices, and the plurality of locations such that driving the vehicle from the current location to the first gas station and then to a final destination requires a first cost of gas. The first cost of gas is less than or equal to the cost of gas of driving the vehicle from the current location to any gas station of the plurality of gas stations other than the first gas station and then to the final destination. The data concerning the current location of the vehicle may be received from a global positioning system.

The present invention also includes a method comprising the steps of receiving data concerning the current location of a vehicle, receiving data concerning a plurality of gas prices at a plurality of gas stations, one gas price for each of the plurality of gas stations, and receiving data concerning a plurality of locations, one location for each of the plurality of gas stations. The method may also include determining a first gas station of the plurality of gas stations based on the current location of the vehicle, the plurality of gas prices, and the plurality of locations such that driving the vehicle from the current location to the first gas station and then to a final destination requires a first cost of gas. The first cost of gas is less than or equal to the cost of gas of driving the vehicle from the current location to any gas station of the plurality of gas stations other than the first gas station and then to the final destination.

DETAILED DESCRIPTION OF THE DRAWINGS

Figure 1:
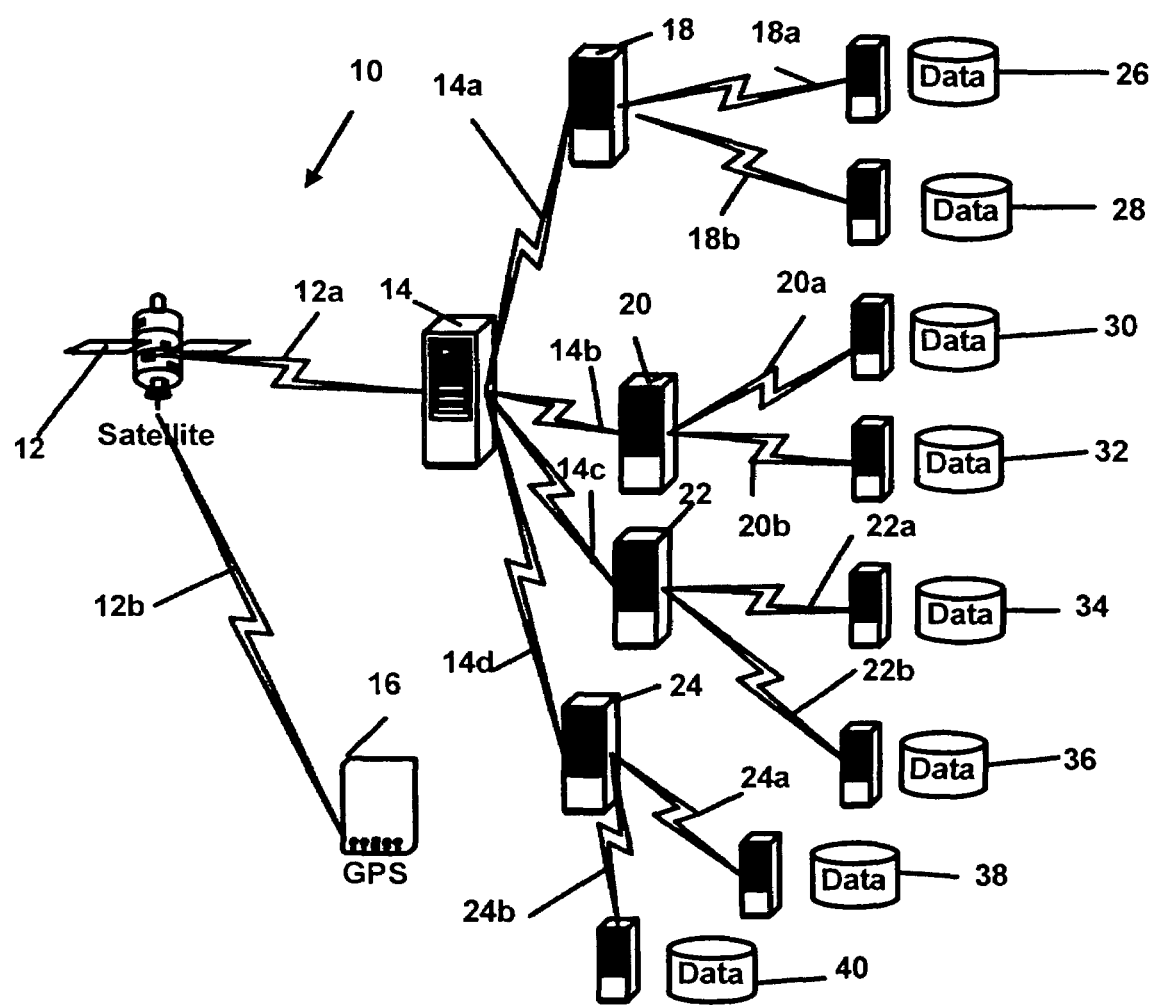
FIG. 1 shows a diagram of system, method, and apparatus in accordance with an embodiment of the present invention.

FIG. 1 shows a diagram of a system, method, and apparatus 10 in accordance with an embodiment of the present invention. The system, method, and apparatus 10 includes a satellite 12, a primary location engine 14, a global positioning system 16 located on a vehicle, such as a vehicle 202 in FIG. 3 located at a current location, a server location engine 18 for locations A and B, a server location engine 20 for locations C and D, a server location engine 22 for Arizona, and a server location engine 24 for locations G and H. The system, method, and apparatus 10 also includes a database 26 for location A, a database 28 for location B, a database 30 for location C, a database 32 for location D, a database 34 for location E, a database 36 for location F, a database 38 for location G, and a database 40 for location H.

Each of the location engines 14, 18, 20, 22, and 24 may be a computer server. Each of the databases 26, 28, 30, 32, 34, 36, 38, and 40 may be computer databases or computer database servers. The computer servers or location engines 14, 18, 20, 22, and 24 are typically used in accordance with one or more embodiments of the present invention to locate the particular computer database server or databases of databases 26, 28, 30, 32, 34, 36, 38 and 40 which contains the locations specific information for the gas stations The satellite 12 may communicate with the global positioning system 16 via communications channel 12b. The satellite 12 may communicate with the primary location engine 14 via communications channel 12a. The primary location engine 14 may communicate with server location engines 18, 20, 22, and 24 via communications channels 14a, 14b, 14c, and 14d, respectively.

The server location engine 18 may communicate with database 26 for location A and database 28 for location B via communication channels 18a and 18b. The server location engine 20 may communicate with database 30 for location C and database 32 for location D via communication channels 20a and 20b. The server location engine 22 may communicate with database 34 for location Flagstaff and database 36 for location F via communication channels 22a and 22b. The server location engine 24 may communicate with database 38 for location G and database 40 for location H via communication channels 24a and 24b.

Figure 2:
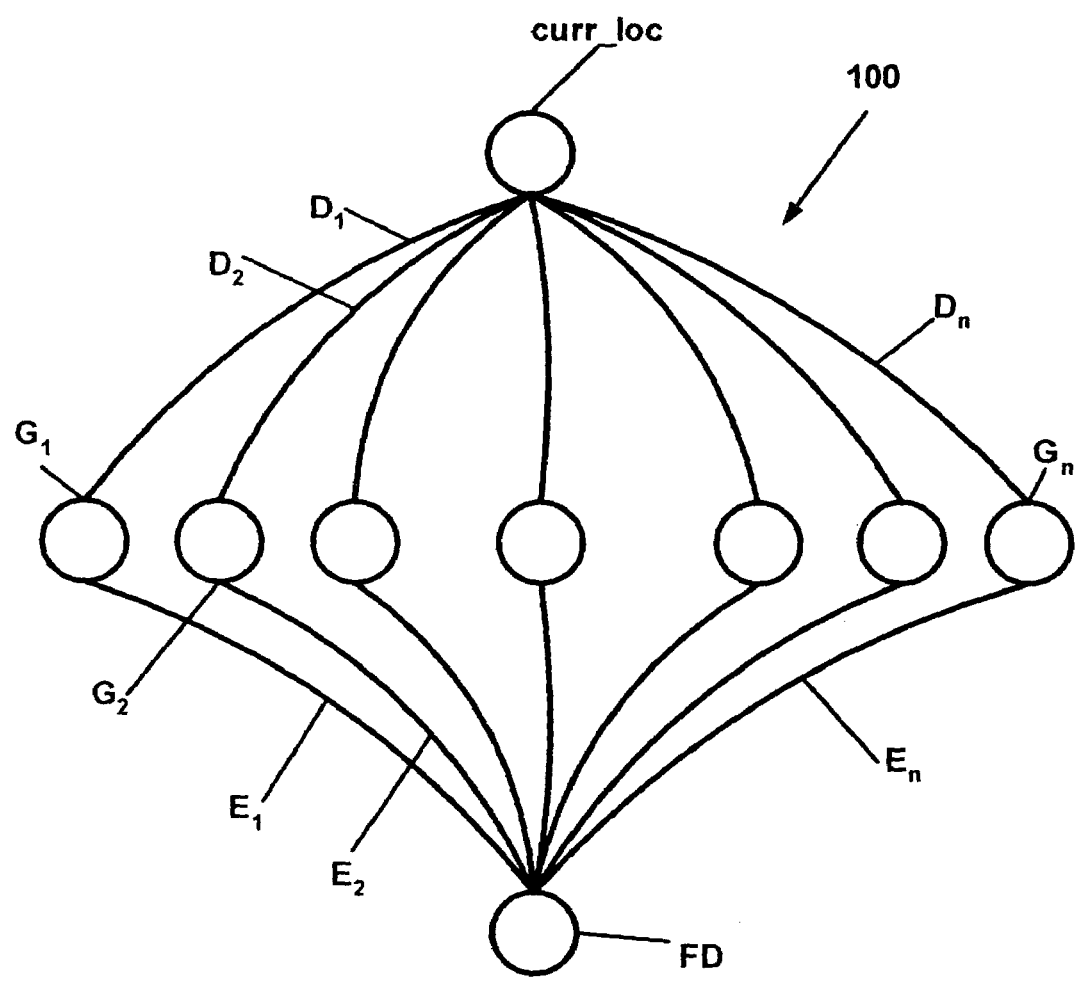
FIG. 2 shows a diagram of a plurality of paths between a current location, a plurality of gas stations, and a final destination.

FIG. 2 shows a diagram 100 of a plurality of paths between a current location "curr_loc", a plurality of gas stations $G_1$, $G_2$, ... $G_n$, and a final destination "FD". For example, there is a path from the "curr_loc" to the gas station $G_1$, and then to the final destination FD. The distance from the "curr_loc" to the gas station $G_1$ is defined as $D_1$. The distance from the gas station $G_1$ to the final destination FD is defined as $E_1$. The distances are not to scale. FIG. 2 merely illustrates that there are a plurality of paths, having a plurality of distances, from the "curr_loc" to the final destination FD, which depend on which gas station an individual goes to. The distance from the "curr_loc" to the gas stations $G_1$, $G_2$, ... $G_n$ is $D_1$, $D_2$, ... $D_n$, respectively. The distance from the gas stations $G_1$, $G_2$, ... $G_n$ to the final destination FD is $E_1$, $E_2$, ... $E_n$, respectively. The distance from the "curr_loc" to the final destination FD may be any one of $D_1+E_1$, $D_2+E_2$, ... $D_n+E_n$ depending on which particular gas station is selected.

Figure 3:
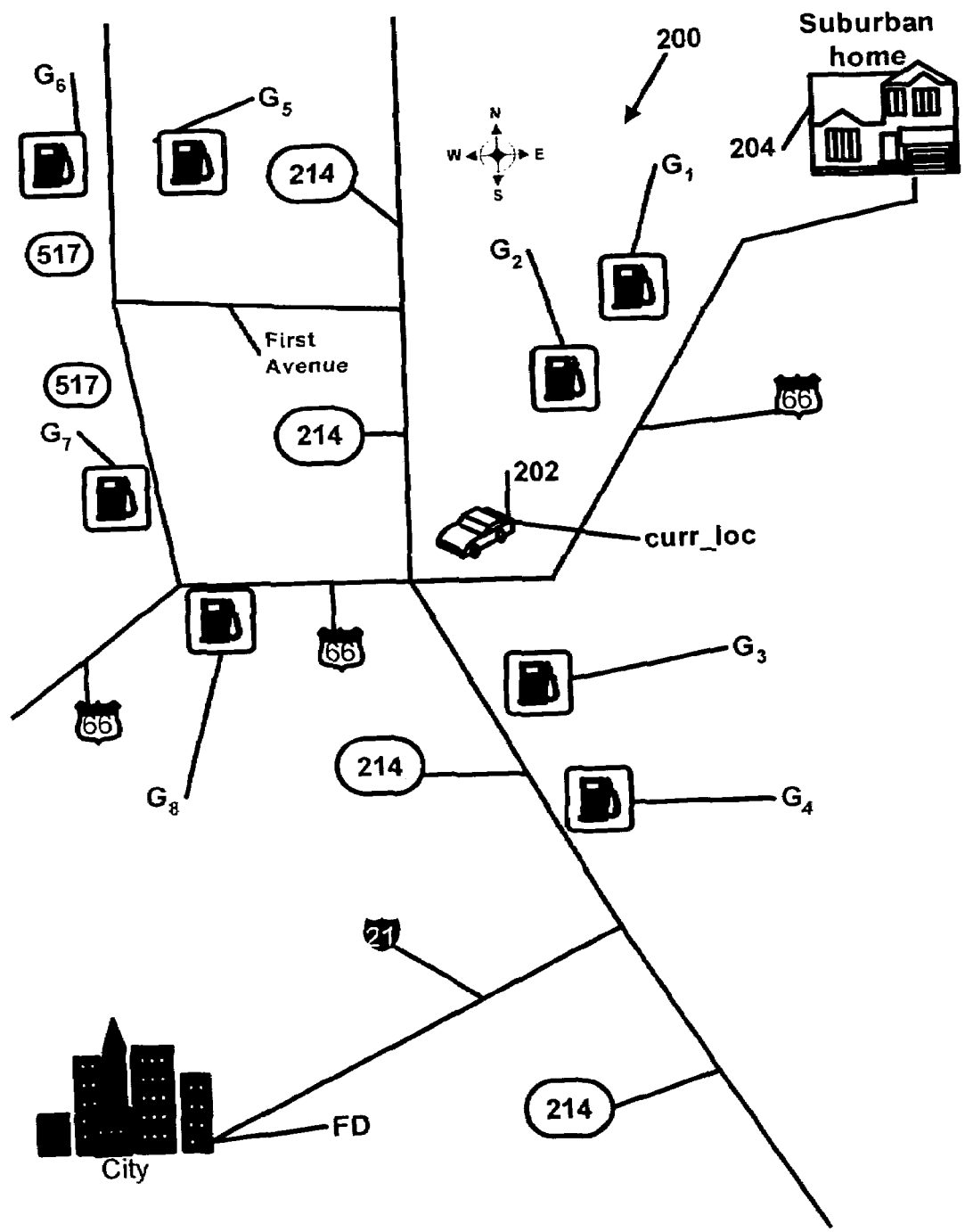
FIG. 3 shows a map with symbols representing a plurality of gas station locations, a current location or origin, a suburban home, and a final destination.

FIG. 3 shows a map 200 with symbols representing a plurality of gas station locations, a current location or origin ("curr_loc"), a suburban home, and a final destination ("FD"). Gas stations $G_1$, $G_2$, $G_3$, $G_4$, $G_5$, $G_6$, $G_7$, and $G_8$ are represented on the map 200. Also, the current location "curr_loc" for a vehicle 202 is shown on map 200. The map 200 also shows a representation for a suburban home 204 and a representation for the final destination "FD". Representations for highways 517, 214, 66, and 21, and a street called "First Avenue" are shown.

The vehicle 202 can travel along one or more of the highways 214, 66, 21, 517, and "First Avenue" to get to the various gas stations or to the final destination FD.

In operation, the satellite 12 provides data via communications channel 12b which suggests a gas station or gas station location to visit, such as one of $G_1, G_2, \ldots G_n$, which minimizes the total cost to purchase gas or other products.

The driver or user of vehicle 202 in FIG. 3, enters various data into the global positioning system or apparatus 16. The driver or user would typically enter the miles per gallon that the vehicle 202 normally gets. The user would also typically enter a price per gallon related to current gas already in the vehicle 202. The price per gallon related to current gas already in the vehicle 202 is used to initially compute an average cost/mile which will be needed for future requests. The user would typically enter the final destination "FD" which will be used to calculate total distance to be traveled. The final destination "FD" is used in a cost/mile calculation which may be performed by an onboard application specific integrated circuit (asic) This service could be integrated into the navigation system by an Original Equipment Manufacturer (OEM) the global positioning system 16 or a processor in or on the vehicle 202. The current location "curr_loc" of the vehicle 202 would be provided by the satellite 12 via communications channel 12b.

The global positioning system or apparatus 16 may send a signal via communications channel 12b to the satellite 12, This could be a service offered by a commercial satellite or telecommunications provider to calculate the exact location of the vehicle 202. The satellite 12 may send data including the exact location of the vehicle 202 to the primary location engine or engine server 14 via communications channel 12a. The server 14 may contain a location engine which will compute which of the databases 26, 28, 30, 32, 34, 36, 38 or 40 to contact based on the vehicle 202's current location "curr_loc". Several databases or database servers will typically be required per geographic area.

Each of databases 26, 28, 30, 32, 34, 36, 38, and 40 will contain the location of gas stations related to the vehicle's current position, "curr_loc", and gas prices at each individual gas station within a specific geographic area. The appropriate database server of 26, 28, 30, 32, 34, 36, 38, or 40 calculates the cost to travel a certain route or path and returns the gas station or stations which would provide the minimum cost.

The location of the gas station or stations that provides the minimum cost along with the price, using global positioning, is sent back from the satellite 12 via communications path 12b to the vehicles navigation system or global positioning system 16. The GPS system 16 provides directions as well as time to travel to the particular gas station.

One method in accordance with one embodiment of the present invention may be called "Dynamic Location Based Cost Minimization Method (DLCM Method)". The following steps may be followed for this embodiment.

1. The vehicle 202's location or "curr_loc" is calculated using GPS. Signals are provided from satellite 12 via communications channel 12b which allow global positioning system 16 to calculate "curr_loc".
2. A user of vehicle 202 inserts into global positioning system 16 or a processor on board the vehicle 202, the miles per gallon of gasoline for the vehicle 202. This information should be stored within the vehicle's navigation system or system 16 or any processor or computer on the vehicle 202. The miles per gallon for the vehicle 202 is used in accordance with an embodiment of the present invention to compute cost/mile for each future request for gasoline.
3. The processor on board the vehicle 202 and/or the global positioning system 16 computes a distance from the current location, "curr_loc" to a plurality of gas stations within a certain radius. The radius could be pre-configured to two miles or could be set manually by the user.
4. The processor on board the vehicle 202 and/or the global positioning system 16 computes the distance from each gas station (within a radius of the "curr_loc") to the final destination, "FD". This gives the total distance traveled to get from point A to point B via the optimal gas station C. That is the total distance is A→B→C.
5. Once the processor on board the vehicle 202 and/or the global positioning system 16 has the total distance for each individual gas station (i.e. for gas station G1, total distance would be $D_1+E_1$; for gas station $G_2$, total distance would be $D_2+E_2$) the processor on board the vehicle 202 or the GPS system 16 computes the cost/mile for each gas station using the miles/gallon for the vehicle 202, and the price for gas at each gas station. Cost/mile for each gas station is stored locally in the on board processor for the vehicle 202 or the vehicle 202's navigation system to compute future average cost/mile. For example, if initially the cost/mile for gas station $G_1$ 0.12 dollars or 12 cents and next time cost/mile is 0.15 dollars or 15 cents, then the actual cost/mile is 0.12+0.15/2=0.135 dollars.
6. The processor on board the vehicle 202 or the global positioning system 16 then computes the total cost for gas for each gas station by taking the cost/mile and multiplying it by the total distance that will be traveled.
7. The final result will be the minimum of the total cost.

| Variable Definitions |
|---|
| curr_loc = current vehicle location |
| mpg = mile per gallon |
| acm = average cost/mile |
| X = price for specified product |
| FD = Final Destination |
| $G_n$ = Gas stations 1 thru n |
| $P_n$ = Price for gas at each gas station for 1 thru n |
| $D_n$ = Distance from curr_loc to gas station n |
| $E_n$ = Distance from gas station n to FD |
| $C_n$ = cost/mile for each $G_n$ cost/mile = $(P_n/\text{gallon})/(\text{miles/gallon})$ = cost/mile |
| $C_{Dn} = (D_n * \text{acm})$ Cost associated with traveling to $D_n$. Initially, we assume acm = 0 |
| $C_{En} = (E_n * C_n)$ Cost associated with traveling to $E_n$. |
| $T_{Cn} = C_{Dn} + C_{En}$ Total cost associated with each route from current location to $G_n$ to FD. |
| $OPT_p = \min(T_{C1}, T_{C2}, T_{C3}, \ldots, T_{Cn})$ |

Mergesort is used to sort and return $OPT_p$. Mergesort was invented by Jonhn von Neumann in 1945. Mergesort was used as an example but there are other sorting methods or algorithms that could be used for example, QuickSort, HeapSort etc Mergesort is a well known standard and published sorting method. Other sorting methods can be used.

If the request is for gas then:

```
{
DLCM(pass in curr_loc, mpg, acm)
    {
    For i= 1 to n
        {
```

Locate all $G_n$ within 5 mile radius of "curr_loc" ($G_n$ has to be registered with the databases. Since we know the coordinates for curr_loc and all $G_n$ we can easily compute distances within the 5 mile radius using GPS see FIG. 3)

```
/*Compute T_Cn*/
temp1= P_n
temp2= D_n
temp3= E_n
temp4¹ = (D_n * acm)
temp5= ((temp1/gallon) / (mpg)) /*this equates to C_n*/
temp6 = (E_n * temp5)
temp7 = temp4 +temp5 */this equates to T_Cn*/
opt[n] = temp7
        }
    }
}
```

¹The actual cost/mile will be the average. For example, if initially the cost/mile is .12 = acm, and next time cost/mile is .15 then the actual cost/mile is .12 + .15/2 = 0.135. This will be returned by Mergesort.

The method in accordance with one embodiment of the present invention can be applied to other requests such as requests for generic staple items like prescriptions, food, etc. In any case, typically, the cost/mile is accounted for in each request. The cost/mile is initially computed as in the method above. The cost can be computed for this item by making a slight modification to DLCM as follows:

```
else
{
X=price, acm=cost/mile.
DLCM(pass in curr_loc, X, acm)
    {
    For i= 1 to n
        {
```

Locate all places within 5 mile radius of curr_loc where a specified item is sold. The search area (radius) is a modifiable variable. The 5 mile radius is used as an example. Other ranges could be used.

```
/*Compute T_Cn + P_n */
P_n = X
temp1= D_n
temp2= E_n
temp3 = acm *(temp2+temp3) + P_n    /*computes the total
                                      cost and price associated with
                                      */ a specified item and location
opt[n]= temp3
        }
    }
}
```

/*Merge-Sort is sent the opt[n] array to be sorted. The result will be the minimum cost based on price, distance and cost/mile. The return value will be the min of opt[ ] and the associated cost/mile used to compute average cost per mile or acm*/

```
Merge-Sort(float opt[ ], int p, int q)
Return opt[1]
}
void Merge-Sort(float opt[ ], int begin, int end)
{
    int mid;
    if (begin < end)
    mid = (begin + end) / 2;
    Merge-Sort(opt, begin, mid);
    Merge-Sort(opt, mid, end);
    Merge(opt, begin, mid, end);
}
void Merge(float v[ ], int start, int mid, int end)
{
    int i, j, k;
    float* tmp = malloc(sizeof(float) * (end – start));
    i = start;
    i = mid;
    k = 0;
    while ((i < mid) && (j < end))
    {
        if (v[i] <= v[j])
            tmp[k++] = v[i++];
        else
            tmp[k++] = v[j++];
    }
    while (i < mid)
        tmp[k++] = v[i++];
    while (i < end)
        tmp[k++] = v[j++];
    for (i = 0; i < (end–start); i++)
        v[start+i] = tmp[i];
    free(tmp);
}
```

Once the minimum cost is computed the processor on board the vehicle 202 or global positioning system 16 receives the following:
1) Gas station location price and directions.
2) Travel time to the gas station.
3) Minimum cost.
4) The new overall cost/mile which would be the current vehicles (cost/mile+new cost/mile)/2. This new cost/mile could be retrieved by making a query to the database which contains the price information specific to the gas station which was selected to have the minimum cost. The new cost/mile would be (price/gallon)/(miles/gallon) The vehicles current cost/mile would then be used to compute the average cost/mile for future requests.

1. A request for gas and information is initiated on the vehicles navigation system.
2. The request is routed to the server which contains gas price information specific to the location where the request for gas originated.

For example, if the request for gas, computed using GPS, originated in Flagstaff, Ariz. the request would be sent to the main location engine server. This server would identify the incoming request as Arizona and would then route the request to the location engine server in Arizona. The request would again be routed to the server that corresponded to the geographic gas price information for Flagstaff. The GMC method would compute the minimum cost for gas as defined in the GMC method above. The minimum cost as well as travel time, distance and directions would be passed back to the vehicle navigation system. The actual path is indicated by the red communication path above. The "curr_loc" is the vehicle 202's current location. $D_1$ thru $D_n$ represent the distance from the vehicles location to all possible gas stations, $G_n$. $E_1$ thru $E_n$ represent the distance from each gas station, $G_n$ to FD, the final destination. The could be n paths to FD the idea is to return to the user the optimal path based on gas price. The total time traveled for the optimal path will also be given to the user.

EXAMPLE

| $G_n$ | $D_n$ (miles) | acm | $C_{Dn}$ | $E_n$ (miles) | *$C_n$ | $T_{En}$ | $T_{Cn}$ (dollars) | $T_n$ (miles) | $P_n$ (dollars) |
|---|---|---|---|---|---|---|---|---|---|
| 1 | 4.4 | 0.13 | 0.572 | 46.9 | 0.152 | 7.1288 | 7.701 | 51.3 | 2.59 |
| 2 | 4.1 | 0.13 | 0.533 | 46.6 | 0.163 | 7.5958 | 8.129 | 50.7 | 2.77 |
| 3 | 1 | 0.13 | 0.13 | 41.5 | 0.156 | 6.474 | 6.604 | 42.5 | 2.65 |
| 4 | 3.5 | 0.13 | 0.455 | 39 | 0.158 | 6.162 | 6.617 | 42.5 | 2.68 |
| 5 | 1.1 | 0.13 | 0.143 | 43.6 | 0.148 | 6.4528 | 6.596 | 44.7 | 2.52 |
| 6 | 1.1 | 0.13 | 0.143 | 43.6 | 0.154 | 6.7144 | 6.857 | 44.7 | 2.61 |
| 7 | 0.4 | 0.13 | 0.052 | 42.9 | 0.155 | 6.6495 | 6.702 | 43.3 | 2.63 |
| 8 | 0.4 | 0.13 | 0.052 | 42.9 | 0.155 | 6.6495 | 6.702 | 43.3 | 2.63 |

*For $C_n$ the mpg used was 17. Also, we assume acm = .13
$T_n = D_n + E_n$

Example Comparing $G_3$ and $G_5$ acm=0.13
$G_3$
Cost to travel to this gas station based on your current cost/mile.
$C_{D3}$=acm*$D_3$=0.13*1=0.13
Cost to travel from this gas station to your final destination.
Price/gallon=$.2.65
Cost/mile=$2.65/17=0.156
Distance to travel to final destination=42.5 miles
$T_{C3}$=$T_3$*$C_3$=42.5*0.156=$6.474
Total cost for this route=$T_{C3}$+$C_3$=0.13+$6.474=$0.6.604
$G_5$
acm=0.13
Cost to travel to this gas station based on your current cost/mile.
$C_{D5}$=acm*$D_5$=0.13*1.1=0.143
Cost to travel from this gas station to your final destination.
Price/gallon=$.2.52
Cost/mile=$2.52/17=0.148
Distance to travel to final destination=44.7 miles
$T_{C5}$=$T_5$*$C_5$=44.7*0.148=$6.453
Total cost for this route=$T_{C3}$+$C_3$=0.143+$6.453=$6.596
$Opt_p$=Min($TC_1$, $TC_2$, $TC_3$, . . . $TC_n$)=$TC_5$=$6.596
See FIG. 3 for a graphical representation.

The actual cost/mile will be the average. For example, if initially the cost/mile is 0.12=acm, and next time cost/mile is 0.15 then the actual cost/mile is 0.12+0.15/2=0.135. This will be returned by Mergesort.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:
1. An apparatus comprising:
   a computer comprising:
   memory; and
   a processor; wherein the processor is programmed to receive data concerning the current location of a vehicle;
   wherein the processor is programmed to receive data concerning a plurality of gas prices at a plurality of gas stations, one gas price for each of the plurality of gas stations;
   wherein the processor is programmed to receive data concerning a plurality of locations, one location for each of the plurality of gas stations;
   wherein the plurality of locations are different; and wherein the processor is programmed to determine a first gas station of the plurality of gas stations based on the current location of the vehicle, the plurality of gas prices, and the plurality of locations such that driving the vehicle from the current location to the first gas station and then to a final destination requires a first cost of gas; and
   wherein the first cost of gas is less than or equal to the cost of gas of driving the vehicle from the current location to any gas station of the plurality of gas stations other than the first gas station and then to the final destination.

2. The apparatus of claim 1 wherein the processor is programmed to receive data concerning the current location of the vehicle from a global positioning system.

3. The apparatus of claim 1 wherein the processor is programmed to allow a user to enter the final destination.

4. The apparatus of claim 1 wherein processor is programmed to allow a user to enter miles per gallon for the vehicle and the determination of the first gas station of the plurality of gas stations is further based on the miles per gallon for the vehicle.

5. The apparatus of claim 1 wherein the processor is programmed to allow a user to enter a price per gallon of gas for gas currently in the vehicle, wherein the price per gallon of gas for gas currently in the vehicle is used to determine the first gas station of the plurality of gas stations.

6. The apparatus of claim 1 wherein after the processor has determined the first gas station, the processor is programmed to provide directions and time to travel to the first gas station.

7. The apparatus of claim 1 wherein the processor is programmed to compute a gas station to final destination distance from each of the plurality of gas stations to the final destination, such that the processor computes a plurality of gas station to final destination distances, one for each of the plurality of gas stations; and wherein the processor is programmed to use the plurality of gas station to final destination distances to determine the first gas station.

8. The apparatus of claim 1 wherein the processor is programmed to compute a vehicle to gas station distance from the vehicle to each of the plurality of gas stations, such that the processor computes a plurality of vehicle to gas station distances, one for each of the plurality of gas stations; and wherein the computer processor is programmed to use the plurality of vehicle to gas station distances to determine the first gas station.

9. The apparatus of claim 8 wherein the processor is programmed to compute a gas station to final destination distance from each of the plurality of gas stations to the final destination, such that the processor computes a plurality of gas station to final destination distances, one for each of the plurality of gas stations; and wherein the processor is programmed to use the plurality of gas station to final destination distances to determine the first gas station.

10. The apparatus of claim 1 wherein the processor is programmed to compute a cost per mile for each of the plurality of gas stations, such that the processor computes a plurality of costs per mile, one for each of the plurality of gas stations; and wherein the processor is programmed to use the plurality of costs per mile to determine the first gas station.

11. The apparatus of claim 10 wherein
each of the plurality of costs per mile is based on a miles per gallon parameter for the vehicle and a price per gallon parameter for each of the plurality of gas stations.

12. The apparatus of claim 11 wherein
each of the plurality of costs per mile is stored in the computer.

13. The apparatus of claim 1 wherein the processor is programmed to compute a total cost for gas for each of the plurality of gas stations by multiplying each of the plurality of costs per mile times a total distance traveled for each of the plurality of gas stations, such that a plurality of total costs for gas are computed, one for each of the plurality of gas stations; and wherein the processor is programmed to use the plurality of total costs for gas to determine the first gas station.

14. The apparatus of claim 10 wherein each of the plurality of costs per mile is based on a stored cost per mile and a current cost per mile.

15. A method comprising the computer implemented steps of
receiving data concerning the current location of a vehicle;
receiving data concerning a plurality of gas prices at a plurality of gas stations, one gas price for each of the plurality of gas stations;
receiving data concerning a plurality of locations, one location for each of the plurality of gas stations;
wherein the plurality of locations are different; and
determining a first gas station of the plurality of gas stations based on the current location of the vehicle, the plurality of gas prices, and the plurality of locations such that driving the vehicle from the current location to the first gas station and then to a final destination requires a first cost of gas; and
wherein the first cost of gas is less than or equal to the cost of gas of driving the vehicle from the current location to any gas station of the plurality of gas stations other than the first gas station and then to the final destination.

16. The method of claim 15 wherein
the data concerning the current location of the vehicle is received from a global positioning system.

17. The method of claim 15 further comprising
receiving data concerning the final destination from a user.

18. The method of claim 15 wherein
receiving data concerning miles per gallon for the vehicle from a user;
and determining the first gas station of the plurality of gas stations based on the miles per gallon for the vehicle.

19. The method of claim 15 further comprising
receiving from a user a price per gallon of gas for gas currently in the vehicle; and
determining the first gas station of the plurality of gas stations based on the price per gallon of gas for gas currently in the vehicle.

20. The method of claim 15 further comprising
after determining the first gas station, providing directions and time to travel to the first gas station.

21. The method of claim 15 further comprising
computing a gas station to final destination distance from each of the plurality of gas stations to the final destination, such that a plurality of gas station to final destination distances are computed, one for each of the plurality of gas stations
and using the plurality of gas station to final destination distances to determine the first gas station.

22. The method of claim 15 further comprising
computing a vehicle to gas station distance from the vehicle to each of the plurality of gas stations, such that a plurality of vehicle to gas station distances are computed, one for each of the plurality of gas stations;
and using the plurality of vehicle to gas station distances to determine the first gas station.

23. The method of claim 22 further comprising
computing a gas station to final destination distance from each of the plurality of gas stations to the final destination, such that a plurality of gas station to final destination distances are computed, one for each of the plurality of gas stations;
and using the plurality of gas station to final destination distances to determine the first gas station.

24. The method of claim 15 further comprising
computing a cost per mile for each of the plurality of gas stations, such that a plurality of costs per mile are computed, one for each of the plurality of gas stations;
and using the plurality of costs per mile to determine the first gas station.

25. The method of claim 24 wherein
each of the plurality of costs per mile is based on a miles per gallon parameter for the vehicle and a price per gallon parameter for each of the plurality of gas stations.

26. The method of claim 25 wherein
each of the plurality of costs per mile is stored in a computer.

27. The method of claim 26 further comprising the computing a total cost for gas for each of the plurality of gas stations by multiplying each of the plurality of costs per mile times a total distance traveled for each of the plurality of gas stations, such that a plurality of total costs for gas are computed, one for each of the plurality of gas stations; and
using the plurality of total costs for gas to determine the first gas station.

28. The method of claim 24 wherein each of the plurality of costs per mile is based on a stored cost per mile and a current cost per mile.

* * * * *